(12) United States Patent
Doepker (10) Patent No.: US 7,980,383 B2
(45) Date of Patent: Jul. 19, 2011

(54) APPARATUS FOR RAISING AND LOWERING

(75) Inventor: Brian T. Doepker, Kalida, OH (US)

(73) Assignee: The Schnipke Family LLC, Ottoville, OH (US)

(*) Notice: Subject to any disclaimer, the term of this patent is extended or adjusted under 35 U.S.C. 154(b) by 409 days.

(21) Appl. No.: 12/118,369

(22) Filed: May 9, 2008

(65) Prior Publication Data

US 2009/0277752 A1 Nov. 12, 2009

(51) Int. Cl.
*B65G 41/00* (2006.01)
(52) U.S. Cl. ............... 198/626.1; 198/861.1; 198/465.1
(58) Field of Classification Search ............... 198/803.3, 198/456, 435, 370.1, 370.07, 468.11, 801; 414/331.14, 331.11
See application file for complete search history.

(56) References Cited

U.S. PATENT DOCUMENTS

| | | | | |
|---|---|---|---|---|
| 4,997,336 A | * | 3/1991 | Galbani | 414/790.2 |
| 5,049,023 A | * | 9/1991 | Knyazkin et al. | 414/280 |
| 6,769,536 B2 | * | 8/2004 | Lutz | 198/861.1 |
| 6,990,796 B2 | | 1/2006 | Schnipke et al. | |

* cited by examiner

*Primary Examiner* — Kavel Singh
(74) *Attorney, Agent, or Firm* — Jason H. Foster; Kremblas & Foster

(57) ABSTRACT

A method and apparatus for moving objects, such as pallets, between an upper horizontal conveyor and a lower horizontal conveyor. A lift raises the pallet from a lower conveyor, and a clamp disposed above the lift with inwardly and outwardly pivotable arms, having inwardly facing fingers at the ends of the arms, clamps the pallet and raises it up to be substantially coincident with the upper conveyor's pallet-supporting surface. A pusher displaces the pallet from the fingers to the upper conveyor. The apparatus can also be operated in reverse to lower pallets from an upper conveyor to a lower conveyor if a fastener, such as electromagnets, is mounted to the end of the pusher.

10 Claims, 13 Drawing Sheets

APPARATUS FOR RAISING AND LOWERING

BACKGROUND OF THE INVENTION

1. Field of the Invention

This invention relates generally to devices used to raise and lower objects, and more particularly relates to a device for rapidly raising and/or lowering an object, such as a pallet in an assembly line, without disrupting the object.

2. Description of the Related Art

It is well known in the manufacturing industry to move objects, such as pallets upon which component parts rest, along an assembly line using conveyor belts. Such pallets are described in U.S. Pat. No. 6,990,796 to Schnipke, et al., which is incorporated herein by reference. Conveyor belts move objects rapidly horizontally, but when a change in vertical position is required, conveyor belts are not optimal. This is due to the fact that when a conveyor belt is angled relative to horizontal, the objects thereon tend to slide due to the typical use of low friction materials in the conveyor belts and the underside of the objects. Such low friction material reduces friction, and therefore wear, but makes movement in the vertical direction difficult.

There is a need for a device that can move pallets and other objects from a horizontal conveyor at one vertical position to another conveyor at a different vertical position.

BRIEF SUMMARY OF THE INVENTION

An apparatus is disclosed for transporting an object between an upper conveyor and a lower conveyor. The apparatus comprises a lift with a prime mover drivingly linked to a platform. The platform has a lower position beneath an upper surface of the lower conveyor, and an upper position between the lower conveyor and the upper conveyor. A clamp has a prime mover drivingly linked to a cap, and at least two opposed arms pivotably mounted to the cap. The arms extend downwardly from the cap and each of the arms has an inwardly facing finger forming an object-supporting surface. The clamp has an upper clamp position with the object-supporting surfaces substantially aligned with an upper surface of the upper conveyor. A lower clamp position is between the upper conveyor and the lower conveyor. A displacer has a prime mover drivingly linked to a plate and aligned with a chamber formed between the arms of the clamp. The displacer is configured to displace the object between the object-supporting surfaces and the upper conveyor.

In a preferred embodiment, the displacer is a pusher that is configured to push the object from the object-supporting surfaces to the upper conveyor. In an alternative embodiment, the displacer is a puller with a fastener configured to pull the object from the upper conveyor to the object-supporting surfaces.

Also contemplated is a method for transporting an object from a lower conveyor to an upper conveyor. The method comprises moving a lift from a lower lift position beneath an object-supporting surface of the lower conveyor to an upper lift position between the lower conveyor and the upper conveyor. This thereby disposes the object resting upon the lower conveyor on the lift and transports the object to the upper lift position. A step of driving a clamp is also included. The clamp has a cap and at least two opposed arms pivotably mounted to the cap. Each of the arms has an inwardly facing finger forming an object-supporting surface. The clamp is driven from an upper clamp position with the object-supporting surfaces of the fingers substantially aligned with an object-supporting surface of the upper conveyor to a lower clamp position with the object-supporting surfaces of the fingers between the upper conveyor and the lower conveyor. The arms are pivoted inwardly to extend the fingers beneath the object, and the lift is moved from the upper lift position toward the lower lift position. The clamp is driven from the lower clamp position in to the upper clamp position, which thereby substantially aligns the object with the object-supporting surface of the upper conveyor. A pusher is aligned with a chamber formed between the arms of the clamp, to displace the object from the object-supporting surfaces of the fingers onto the upper conveyor.

The method and apparatus for moving objects, such as pallets, between an upper horizontal conveyor and a lower horizontal conveyor is described herein. The lift raises the pallet from the lower conveyor, and the clamp disposed above the lift with inwardly and outwardly pivotable arms, and inwardly facing fingers at the ends of the arms, clamps the pallet and raises it up to be substantially coincident with the upper conveyor's pallet-supporting surface. The pusher displaces the pallet from the fingers to the upper conveyor. The apparatus can also be operated in reverse to lower pallets from an upper conveyor to a lower conveyor if a fastener, such as electromagnets, is mounted to the end of the pusher

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 1:
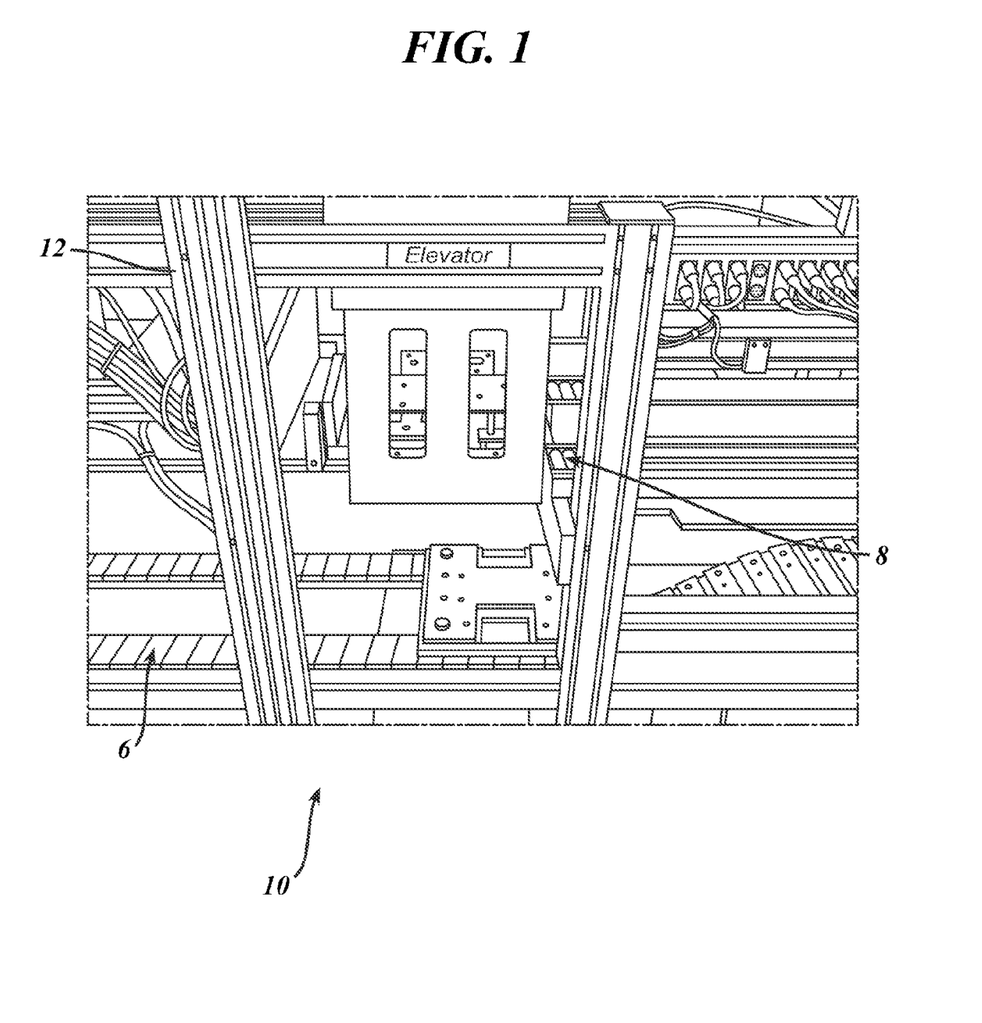
FIG. 1 is a view in perspective illustrating the preferred embodiment of the present invention in cooperation with existing devices.

The preferred embodiment of the transporting apparatus 10 is illustrated in FIG. 1, in which the apparatus 10 is mounted in a cooperative configuration with a conventional dual level conveyor system. A lower, substantially horizontal conveyor 6 is mounted to a frame 12, and an upper, substantially horizontal conveyor 8 is mounted to the frame 12 above the lower conveyor 6. The conveyors 6 and 8 are conventional with closed loops of material, such as flexible, fiber-reinforced rubber or low friction plastic, forming belts that are driven in a conventional manner to convey objects resting upon an upper span thereof in a preferred direction.

The frame 12 is a framework of rigid members mounted together to form a supporting structure to which the components of the invention, and some of the conventional structures the invention cooperates with, are mounted. In a preferred embodiment, the frame 12 comprises extruded aluminum beams, but any comparable material and any equivalent material and configuration can be substituted for these.

Figure 2:
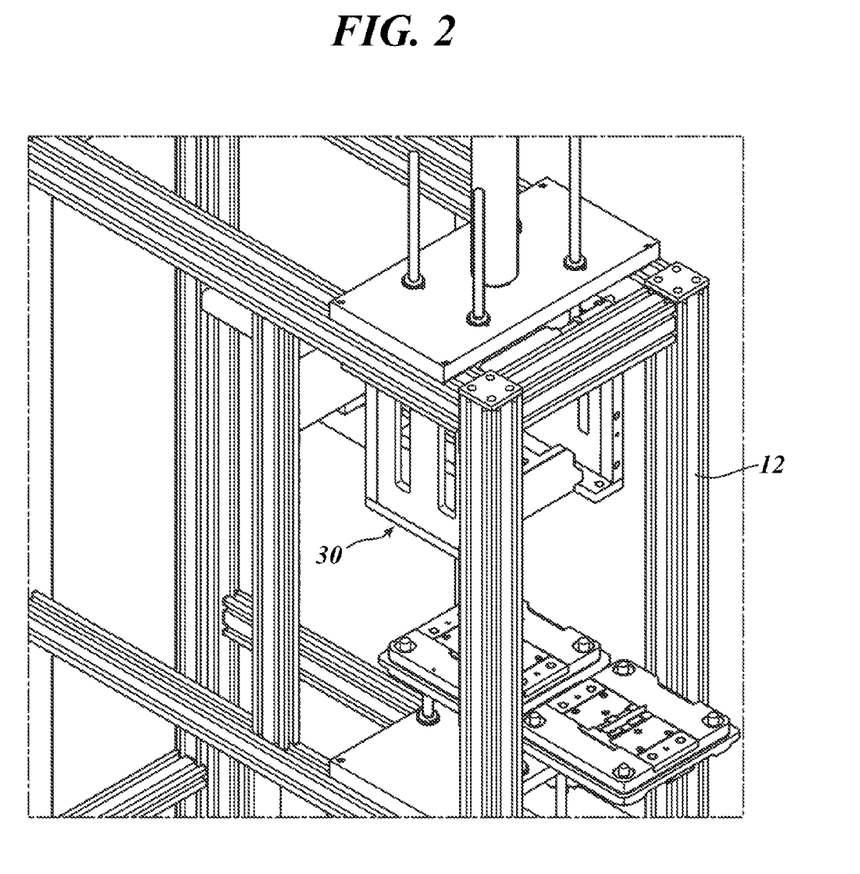
FIG. 2 is a schematic view in perspective illustrating the apparatus of the invention.

It should be noted that terms such as "front," "rear," "top," "bottom," "horizontally," "vertically," "laterally," "longitudinally," "above" and "below" are used herein to describe the relative position and orientation of various components of the invention, all with respect to the geometry and orientation of the apparatus 10 in an operable orientation, which is shown in FIG. 2. Likewise, the terms "upstream" and "downstream" refer to the direction of travel of objects on a conveyor, in which the upstream position is a point from which an object on the conveyor starts and the downstream position is a point to which the object on the conveyor moves from the upstream position. This terminology includes the words specifically mentioned, derivatives thereof, and words of similar import, as understood by a person having ordinary skill in the art.

The apparatus 10 includes three main components mounted to the frame 12 that operate to raise, and (in a preferred alternative embodiment that is slightly modified) lower, pallets or other objects from one horizontally-oriented conveyor to another horizontally-oriented conveyor that is spaced vertically from the other. The first main component is the lift 20, which raises the pallet 100 from the lower conveyor 6 to an intermediate point between the lower and upper conveyors 6 and 8. The second main component is the clamp 30 that lifts the pallet 100 from the intermediate point to substantially the same level as the upper conveyor 8. The third main component is the pusher plate 50, which pushes the pallet from the clamp 30 onto the upper conveyor 8. These three main components are described next in detail.

Figure 3:
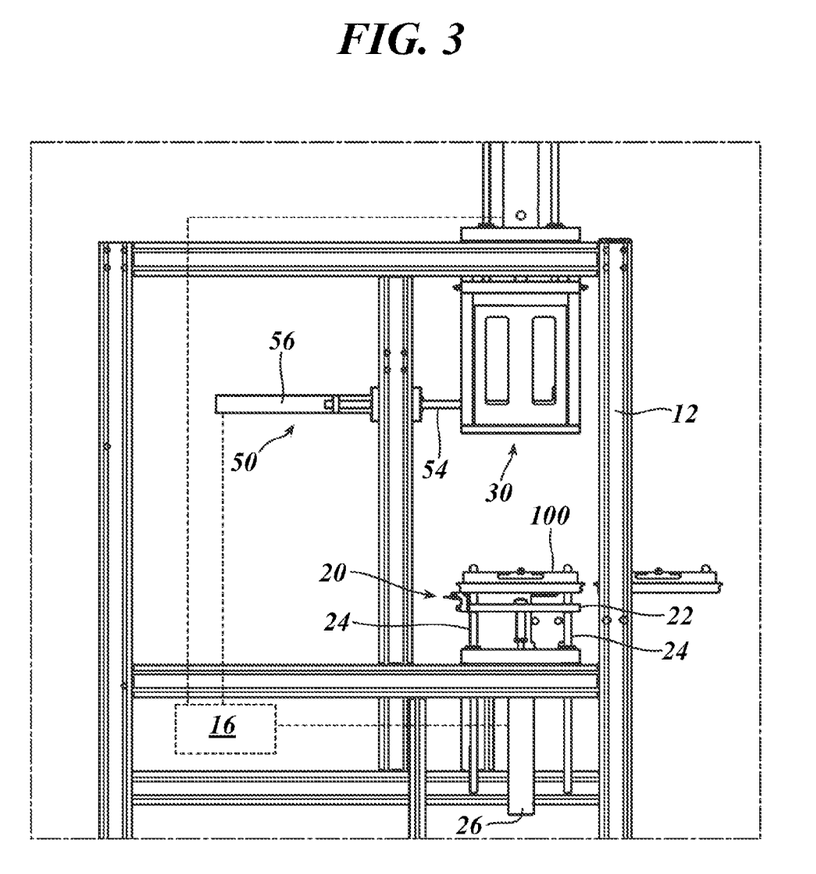
FIG. 3 is a schematic side view illustrating the apparatus of the invention.

The lift 20, best viewed in FIG. 3, has a rigid platform 22 that is preferably a steel plate, but could be any suitable material. One or more positive locating devices, such as conventional tapered pins 23 (shown in FIG. 8), are mounted at each corner on the upper surface of the platform 22. These positive locating devices correspond to complementary structures, such as tapered sockets, in the underside of the pallets as is conventional for positively locating the pallets on any lifting device. Thus, when the pins 23 of the lift 20 are inserted fully into the sockets of the pallet, the precise location of the pallet and its components are fully known. By "known" it is meant that the precise location can be defined with certainty, such as with numbers and units in a computer program, relative to a reference point.

Four legs 24 extend downwardly from rigid connection to the platform 22 into bearings, such as conventional linear bearings (not shown), mounted to the frame 12 for guiding the platform 22 through its vertical path of travel. A prime mover, such as the pneumatic ram 26 with a housing mounted to the frame 12 and a drive rod mounted to the underside of the platform 22, drives the platform vertically.

The lift 20 has a lower position, which is preferably when the upper face of the platform 22 is beneath the pallet-supporting surface of the lower conveyor 6. The lift 20 also has an upper position, which is when the upper face of the platform 22 is intermediate, and preferably about halfway between, the pallet-supporting surface of the lower conveyor 6 and the pallet-supporting surface of the upper conveyor 8. The upper position can vary from about halfway between the conveyors' supporting surfaces, but this is preferred.

The ram 26 drives the platform 22 and legs 24 between the upper and lower positions of the lift 20 when actuated by a central computer 16 (see FIG. 3). The central computer 16 is preferably a computer programmed to receive input signals and actuate the devices described herein according to the software, as is known in the manufacturing industry. The central computer 16 is connected to the drive mechanisms of the apparatus 10 and any sensors in order to control the operation of the apparatus 10, such as by actuating the ram 26 at the prescribed time according to input signals and the positions of related mechanisms.

Figure 6:
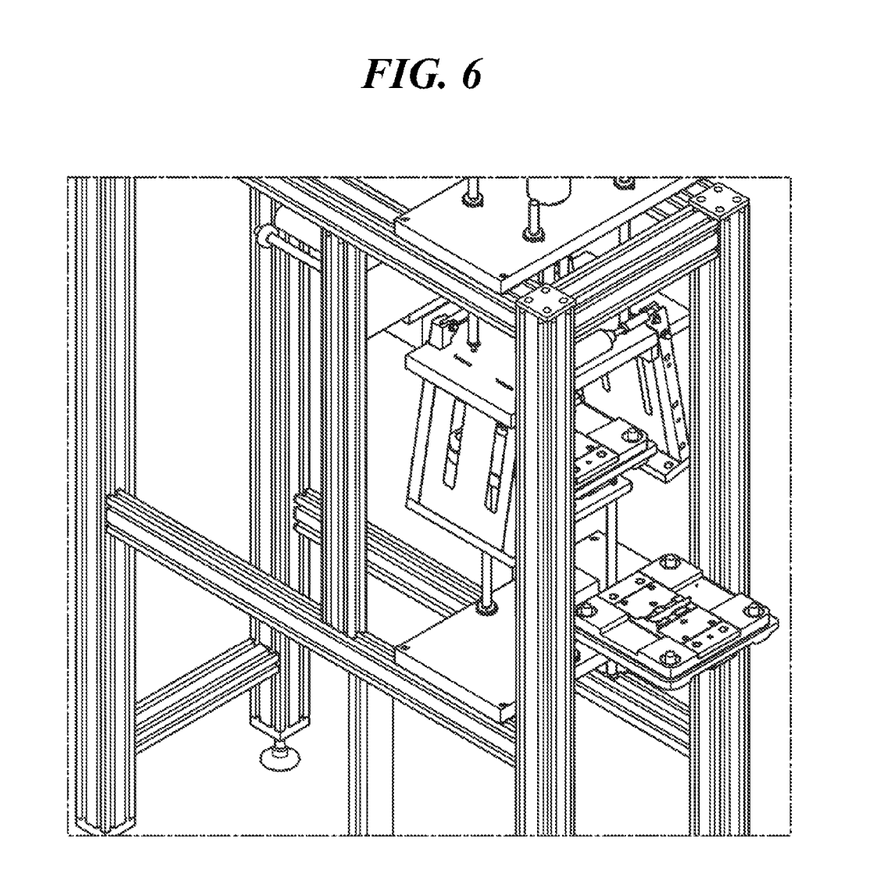
FIG. 6 is a schematic view in perspective illustrating the apparatus of the invention in a later state of the preferred process.
Figure 7:
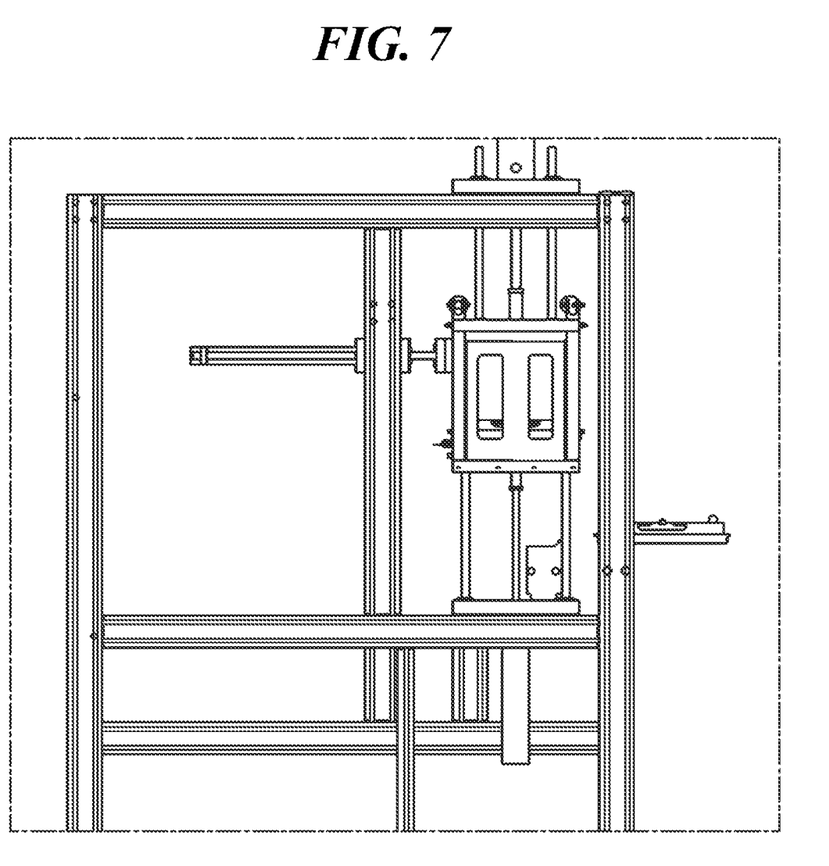
FIG. 7 is a schematic side view illustrating the apparatus of the invention in the state of the process shown in FIG. 6.

In FIG. 3, the platform 22 is shown in the lower position with the pallet 100 resting on the platform 22. Before the pallet 100 is in this position, the pallet 100 is first driven by the lower conveyor 6 over the lift 20, as shown in FIG. 2. The pallet 100 is driven along the lower conveyor 6 to a conventional stopping mechanism (not shown), such as a solenoid with a retractable pin that is inserted into the path of the pallet 100 to obstruct its passage. The stopping mechanism is connected to the central computer 16 and is positioned along the lower conveyor 6 to halt advance of the pallet 100 past a predetermined point until actuated by the central computer 16 to retract and permit the pallet 100 to pass. The stopping mechanism preferably halts the pallet 100 just upstream of the platform 22 to permit the lift 20 to move up and down without striking the waiting pallet 100. Once the platform 22 is lowered by the ram 26 to its lower position, the computer actuates the mechanism to release the pallet 100. The pallet 100 is then driven downstream by the lower conveyor 6 where it is stopped by a second stopping mechanism that positions the pallet 100 directly above the lift 20. The next upstream pallet then rests against the first stopping mechanism and is in position for release to the lift 20. The ram 26 drives the platform 22 upwardly until the pins 23 therein are inserted into the sockets of the pallet 100, and, which continued actuation by the ram 26, the pallet 100 is lifted upwardly to the intermediate position, as shown in FIGS. 6 and 7.

Preferably before, but alternatively during or after, the lift 20 begins raising the pallet 100 to the intermediate position, the clamp 30 drops down from its higher position, which is shown in FIGS. 2 and 3, toward the lift 20 to accept the raised pallet 100. The clamp 30 has a cap 32, best viewed in FIG. 4, from which four legs 34 (see FIG. 5) extend from rigid connection to corners of the cap 32 upwardly into bearings, such as conventional linear bearings (not shown), mounted to the frame 12 for guiding the cap 32 through its vertical path of travel. A prime mover, such as the pneumatic ram 36 with a housing mounted to the frame 12 and a drive rod mounted to the upper surface of the cap 32, drives the cap 32 vertically. Thus, the clamp 30 is raised and lowered when actuated by the central computer 16 connected to the ram 36.

Two arms 37 and 38 pivotably mount to the cap 32 to permit lateral displacement as actuated by one or more prime movers, such as pneumatic rams (not shown) mounted on the cap 32. The term "lateral" refers to a direction transverse to the longitudinal axis of the conveyors 6 and 8, which is also the line along which movement of the pallet 100 occurs. The prime movers that displace the arms 37 and 38 are connected to the central computer 16, which actuates the same. By actuating the prime movers, the lower ends of the arms 37 and 38 are driven, preferably simultaneously, either inwardly toward the pallet 100 or outwardly away from the pallet 100.

There are fingers 47 and 48 rigidly and preferably perpendicularly mounted to the lower edges of the arms 37 and 38, respectively, in order to form upwardly facing sliding surfaces for the pallet 100, as described below. The arms 37 and 38 pivot inwardly and outwardly to displace the fingers 47 and 48 beneath and away from the pallet 100, respectively. When the fingers 47 and 48 are positioned as far inward as they are designed to be disposed, a plane contains both upwardly facing surfaces of the fingers, which form the upwardly facing sliding surfaces. The inwardly facing surfaces of the arms 37 and 38 form guides spaced substantially the same distance as the width of the pallet 100. Thus, when the pallet 100 is positioned within the chamber between the arms 37 and 38, the pallet 100 is guided in the longitudinal direction and cannot slide laterally a substantial amount.

Figure 4:
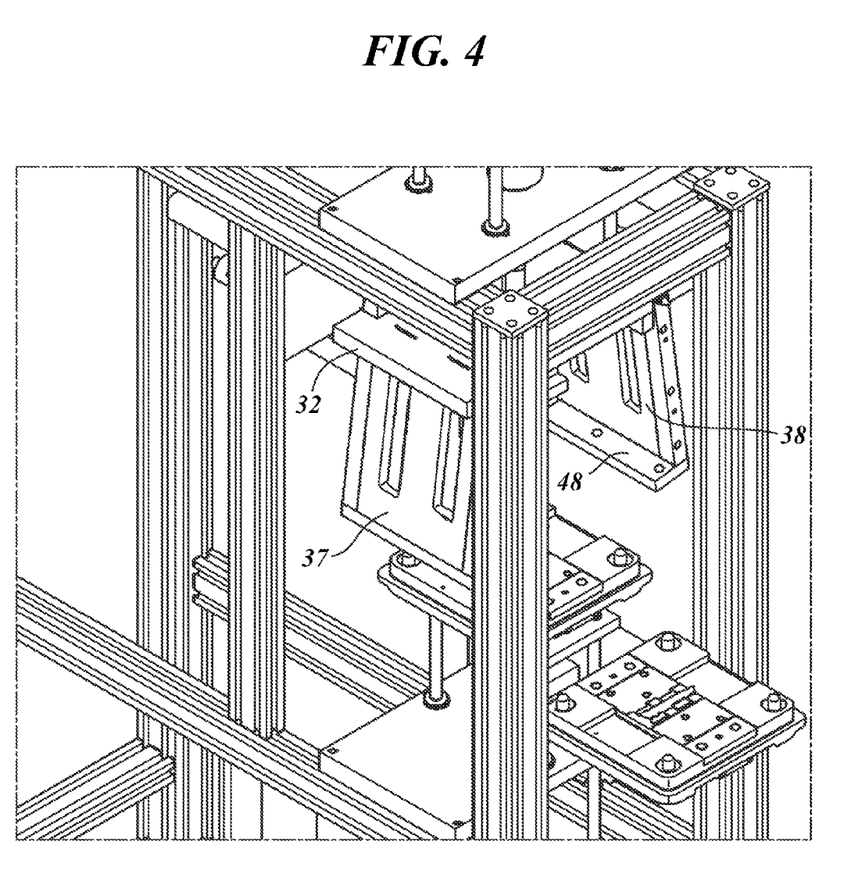
FIG. 4 is a schematic view in perspective illustrating the apparatus of the invention in a later state of the preferred process.
Figure 5:
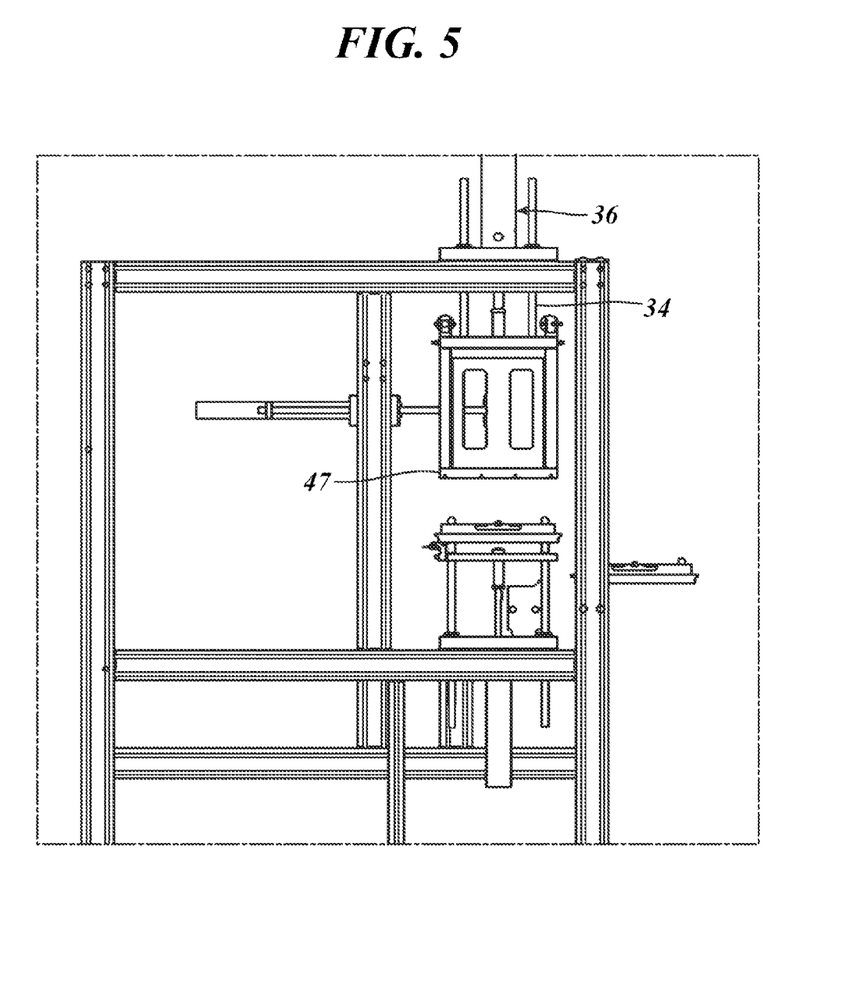
FIG. 5 is a schematic side view illustrating the apparatus of the invention in the state of the process shown in FIG. 4.
Figure 8:
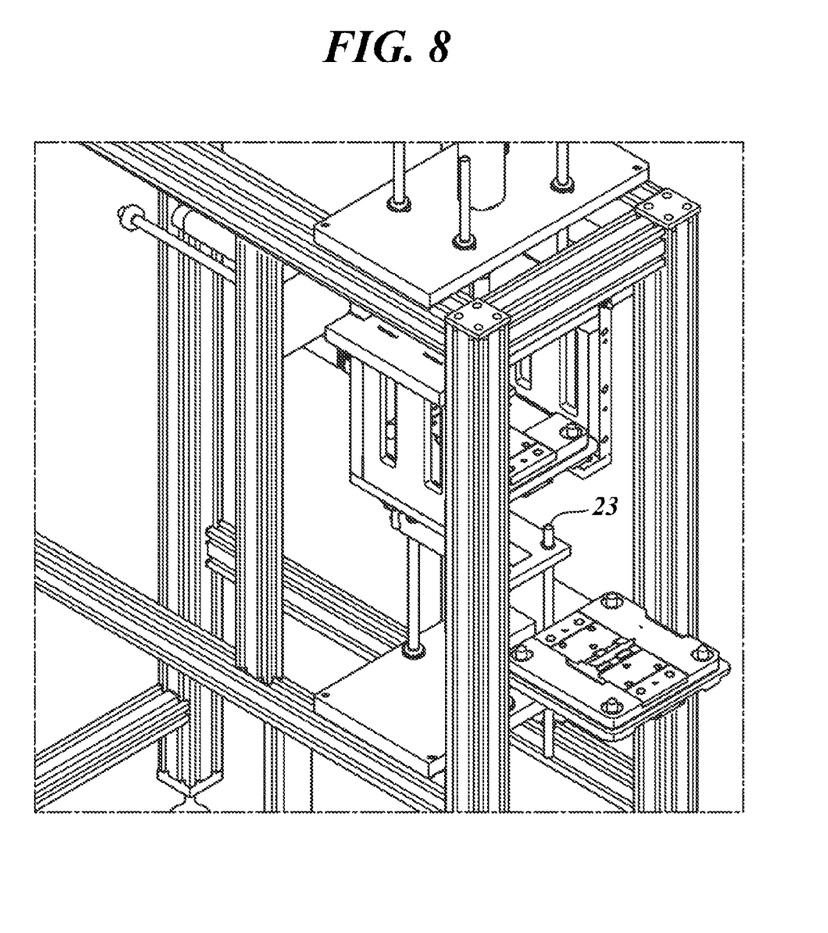
FIG. 8 is a schematic view in perspective illustrating the apparatus of the invention in a later state of the preferred process.

When the clamp 30 is lowered toward the lift 20 upon which the pallet 100 rests, the arms 37 and 38 are spread as far apart as they are designed to be disposed and the inwardly facing tips of the fingers 47 and 48 are spaced farther than the width of the pallet 100, as shown in FIGS. 4 and 6. This is because, even though the platform 22 is narrower than the distance between the fingers 47 and 48, the pallet 100 is not. The clamp 30 is lowered to position the cap 32 at its lowest point, at which point the fingers 47 and 48 are preferably beneath the lower face of the pallet 100 as the pallet 100 rests upon the lift 20 in its higher position, as shown in FIGS. 6 and 7. Preferably, the clamp 30 reaches its lower limit prior to the lift 20 reaching its upper limit, but this is not critical. Upon reaching its lowest position, and after the pallet 100 is in the uppermost position of the lift 20, the central computer 16 actuates the clamp 30 to pivot the arms 37 and 38 inwardly, thereby positioning the fingers 47 and 48 beneath the pallet 100, and providing the above-described sliding surface and lateral guides for the pallet 100, as shown in FIGS. 8 and 9.

Figure 10:
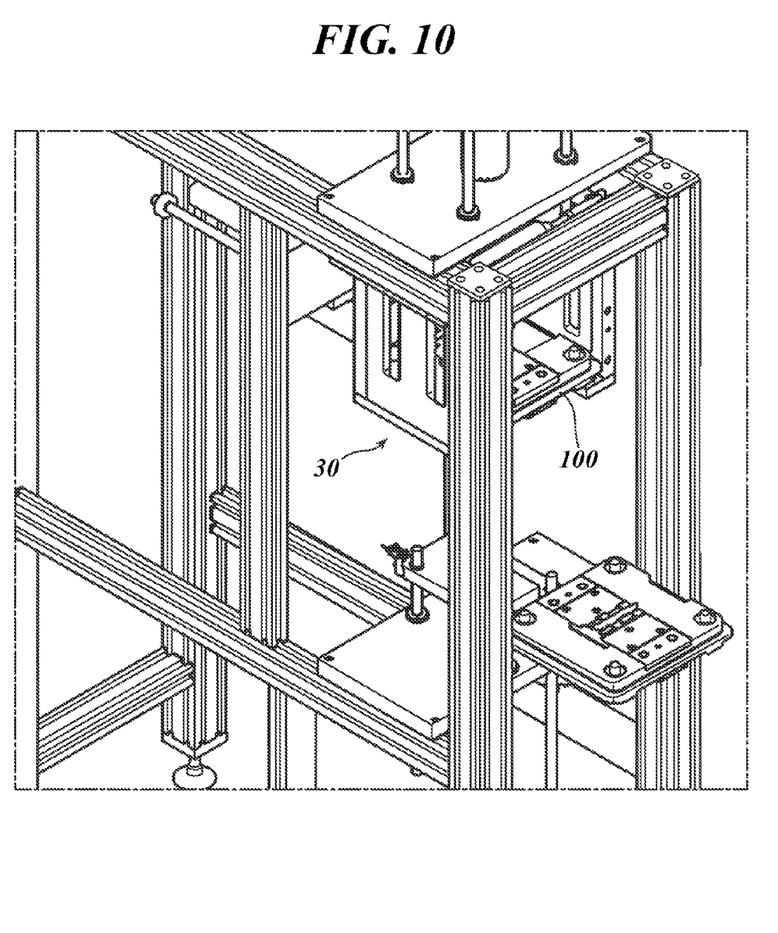
FIG. 10 is a schematic view in perspective illustrating the apparatus of the invention in a later state of the preferred process.

Once the fingers 47 and 48 are positioned beneath the pallet 100, the lift 20 is driven downwardly to its lower position by the cylinder 26 (as shown in FIG. 10) so that another pallet can be placed on the lift 20. During the process of loading another pallet onto the lift 20, the clamp 30 is driven upwardly to its higher position, which is where the sliding surfaces of the fingers 47 and 48 are substantially coplanar with the object-supporting surfaces of the upper conveyor 8. This is the position shown in FIGS. 1 and 10, and allows the pallet 100 to be pushed off of the clamp 30 onto the upper conveyor 8.

Figure 9:
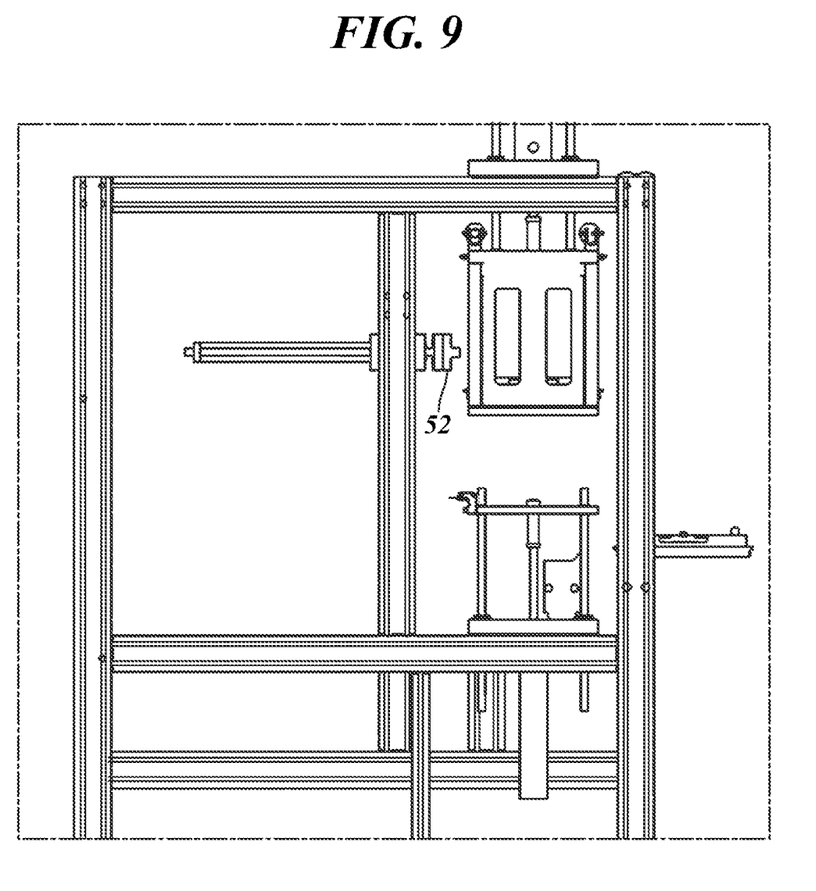
FIG. 9 is a schematic side view illustrating the apparatus of the invention in the state of the process shown in FIG. 8.
Figure 11:
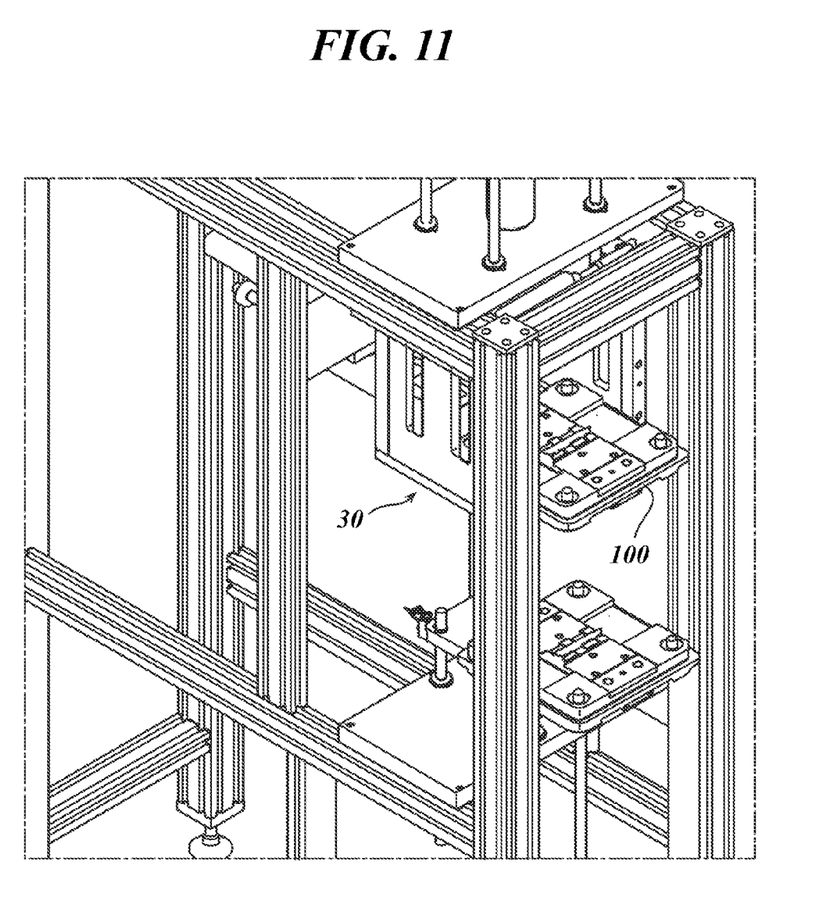
FIG. 11 is a schematic view in perspective illustrating the apparatus of the invention in a later state of the preferred process.
Figure 12:
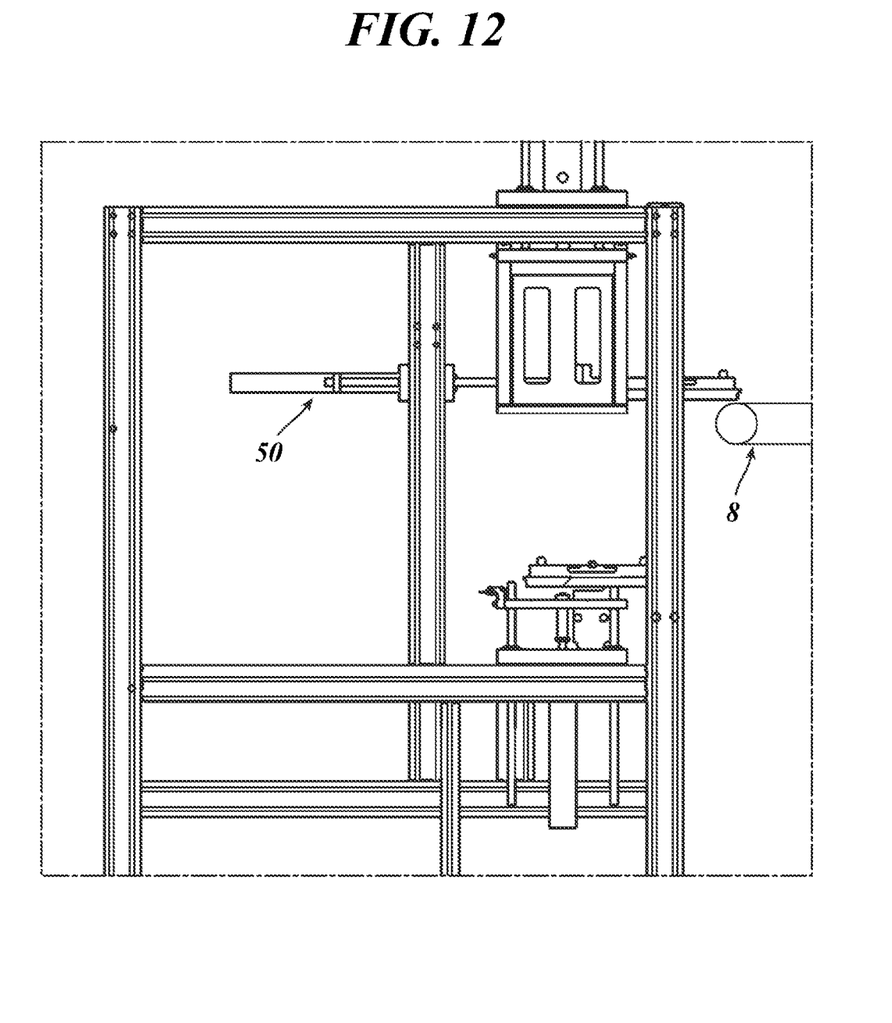
FIG. 12 is a schematic side view illustrating the apparatus of the invention in the state of the process shown in FIG. 11, and includes a schematic illustration of the upper conveyor.
Figure 13:
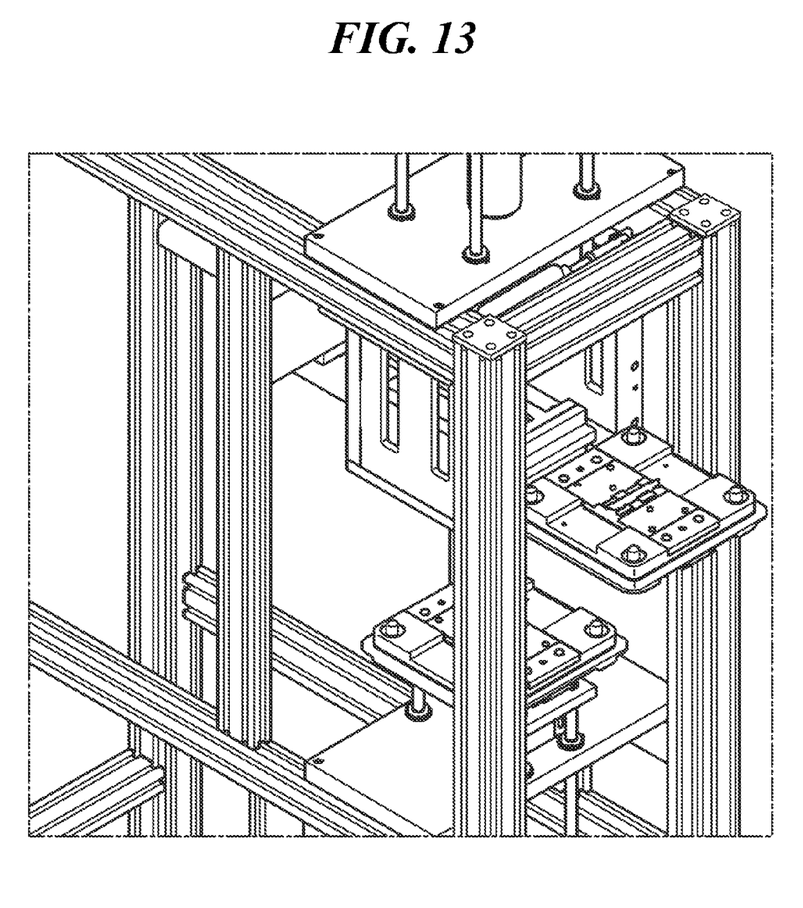
FIG. 13 is a schematic view in perspective illustrating the apparatus of the invention in a later state of the preferred process.

The third main component of the apparatus 10 is the pusher 50, which is best viewed in FIG. 3, having a plate 52, which is best viewed in FIG. 9, to which a drive rod 54 is mounted. The drive rod 54 is the drive rod of a prime mover, preferably the pneumatic ram 56, which is mounted to the frame 12 and connected to the central computer 16. The ram 56 drives the plate 52 along a substantially horizontal path for pushing pallets resting on the fingers 47 and 48 onto the upper conveyor 8. Therefore, after the clamp 30 lifts the pallet to the higher position, which is shown in FIGS. 1 and 10, the pusher 50 is driven horizontally from its retracted position shown in FIG. 9 toward the upper conveyor 8 as shown in FIGS. 11-13. The pusher 50 forces the pallet 100 to slide longitudinally onto the upper conveyor 8, and the force of the constantly running conveyor 8 pulls the pallet 100 away from the pusher 50 and clamp 30.

After the pusher 50 has pushed the pallet 100 off the clamp 30, the clamp 30 is driven downwardly to accept another pallet from the lift 20. While the clamp 30 is in the process of being driven downward, the arms 37 and 38 are pivoted open to receive another pallet on the lift 20. Furthermore, in the preferred embodiment, the pusher 50 has not retracted fully before the clamp 30 begins its descent. However, because of the distance between the pallet-supporting surface of the fingers 47 and 48 and the underside of the cap 32, the clamp 30 can descend fully to its lower position while the pusher 50 is in the process of retracting.

It will become apparent that the main components of the invention preferably move simultaneously in order to reduce the amount of time it takes to raise a pallet from the lower conveyor 6 to the upper conveyor 8. This simultaneous movement provides the most efficient use of the space and time available for raising pallets. In the preferred embodiment, as soon as the lift 20 is retracted to below the pallet-supporting surface of the lower conveyor 6, the central computer 16 actuates the stopping mechanism to permit another pallet to be conveyed over the lift 20 to the second stopping point. At the same time, the pallet on the clamp is pushed off onto the upper conveyor 8. Furthermore, as soon as a pallet is clamped by the clamp 30, the lift 20 begins to retract toward its lower position, because it is no longer necessary to support the pallet. By simultaneously carrying out different steps of the process, the invention can raise pallets very rapidly from one conveyor to the other.

There are structural features that permit such simultaneous movement. For example, the lift 20 raises the pallet about half the distance between the upper and lower conveyors. The clamp 30 raises the pallet the remaining distance. Because these components share the task of lifting the pallet, the clamp 30 is dispensing the pallet to the upper conveyor 8 while the next upstream pallet is loaded onto the lift 20 from the lower conveyor 6. A pallet is being unloaded from the clamp at the same time that a pallet is being loaded onto the lift. Very little time is lost in transferring the pallet from the lift to the clamp, and substantial time is saved by the simultaneous loading and unloading.

In a pallet-lowering embodiment of the invention, which can be used in cooperation with a duplicate of the above-described embodiment, the invention described above for raising pallets or other objects from a lower conveyor to an upper conveyor can be modified slightly in order to lower pallets or other objects from an upper conveyor to a lower conveyor. For example, this second embodiment can be used at the opposite end of the upper and lower conveyors 6 and 8 as the apparatus 10.

The lowering embodiment of the invention is not illustrated, because, other than one minor modification that is explained in detail below, the apparatus is identical to the apparatus 10 described above and shown in FIGS. 1-13. The lowering embodiment receives pallets from the upper conveyor 8 when the clamp is raised to its higher position. There is a stopping mechanism at the end of the upper conveyor 8 that stops pallets from falling off the end of the upper conveyor 8. The stopping mechanism can be a solenoid that inserts a rod into the path of the pallet and is connected to the central computer 16.

A puller is mounted to the frame 12, and is identical to the pusher 50 described above, except that it has a fastener on the face of its plate. The fastener is preferably an electromagnet or a plurality of electromagnets connected to the central computer 16 that attach to and detach from a ferromagnetic surface of the pallet. The fastener could be any suitable structure that permits the puller plate to removably attach to the pallet on the upper conveyor 8. The puller extends through the chamber between the arms of the clamp, which are positioned in their innermost position with their fingers providing a pallet-supporting surface, and is driven by its own prime mover to retract and pull the pallet onto the fingers. Once this occurs, the pallet is fully supported by the clamp, and the clamp is driven downwardly, thereby clearing a space above the pallet through which the puller is extended toward the upper conveyor 8 to pull another pallet from the upper conveyor 8.

The lift is extended to its intermediate position to receive the pallet from the downwardly descending clamp. Once the pallet is placed on the platform of the lift, the arms of the clamp spread apart, and the lift retracts, thereby descending downwardly with the pallet. After the clamp has spread its arms, it begins to ascend again and draws its arms inwardly once the fingers have passed the pallet. Upon reaching the higher position, the clamp is ready to receive another pallet as pulled onto the clamp by the puller.

The lift descends downwardly with the pallet until the lower surface of the pallet rests upon the pallet-supporting surface of the lower conveyor 6, which extends beyond the upper conveyor 8 as shown in FIG. 1. After the pallet contacts the lower conveyor 6, and the platform fully withdraws its pins from the pallet, the pallet is carried away by the constantly moving lower conveyor 6. The lift then extends upwardly to receive another pallet from the descending clamp.

The raising apparatus 10 and the lowering embodiment described immediately above are preferably used together to take empty pallets from the lower conveyor 6, raise them up to the upper conveyor 8 where they are filled with a surgical cartridge that has multiple components installed therein at stations disposed at different longitudinal positions on the upper conveyor 8. Once the pallets reach the end of the upper conveyor 8, the completed cartridges have been removed and the empty pallet is lowered to the lower conveyor 6 by the lowering device at the opposite end of the upper conveyor 8 from the apparatus 10. The lower conveyor 6 transports empty pallets beneath the stations disposed along the upper conveyor 8 to the opposite end for raising up to the upper conveyor 8 for use again. This process is cyclical and can be repeated numerous times for one or more pallets.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for transporting an object between an upper conveyor and a lower conveyor, the apparatus comprising:
    (a) a lift with a prime mover drivingly linked to a platform having a lower position beneath an upper surface of the lower conveyor, and an upper position between the lower conveyor and the upper conveyor;
    (b) a clamp with a prime mover drivingly linked to a cap and at least two opposed arms pivotably mounted to the cap and extending downwardly therefrom, each of the arms having an inwardly facing finger forming an object-supporting surface, the clamp having an upper position with the object-supporting surfaces substantially aligned with an upper surface of the upper conveyor and a lower position with the object-supporting surfaces between the upper conveyor and the lower conveyor; and
    (c) a prime mover drivingly linked to a plate and aligned with a chamber formed between the arms at the clamp's upper position, the prime mover being configured to move along a substantially horizontal plane relative to the arms of the clamp when the arms are stationary to engage and forcibly slide the object between the object-supporting surfaces and the upper conveyor.

2. The apparatus in accordance with claim 1, wherein the prime mover further comprises a pusher being configured to push the object from the object-supporting surfaces to the upper conveyor.

3. The apparatus in accordance with claim 1, wherein the prime mover further comprises a puller with a fastener configured to pull the object from the upper conveyor to the object-supporting surfaces.

4. A method for transporting an object from a lower conveyor to an upper conveyor, the method comprising:
    (a) moving a lift from a lower lift position beneath an object-supporting surface of the lower conveyor to an upper lift position between the lower conveyor and the upper conveyor, thereby disposing the object resting upon the lower conveyor on the lift and transporting the object to the upper lift position;
    (b) driving a clamp, having:
        (i) a cap; and
        (ii) at least two opposed arms pivotably mounted to the cap, each of the arms having an inwardly facing finger forming an object-supporting surface,
    from an upper clamp position with the object-supporting surfaces of the fingers substantially aligned with an object-supporting surface of the upper conveyor to a lower clamp position with the object-supporting surfaces of the fingers between the upper conveyor and the lower conveyor;
    (c) pivoting the arms inwardly to extend the fingers beneath at least a portion of the object;
    (d) moving the lift from the upper lift position toward the lower lift position;
    (e) driving the clamp from the lower clamp position to the upper clamp position, thereby substantially aligning the object with the object-supporting surface of the upper conveyor; and
    (f) extending a pusher aligned with a chamber formed between the arms of the clamp along a substantially horizontal plane relative to the arms of the clamp when the arms are stationary, to engage and forcibly slide the object from the stationary, object-supporting surfaces of the fingers onto the upper conveyor.

5. The method in accordance with claim 4, further comprising the step of pivoting the arms outwardly.

6. The method in accordance with claim 4, wherein the step of moving the lift from the upper lift position toward the lower lift position is performed after the step of pivoting the arms inwardly to extend the fingers beneath at least a portion of the object, thereby causing the object to rest upon the object-supporting surfaces of the fingers.

7. The method in accordance with claim 4, wherein the step of moving the lift from the upper lift position toward the lower lift position is performed before the step of driving the clamp from the lower clamp position to the upper clamp position.

8. A method for transporting an object from an upper conveyor to a lower conveyor, the method comprising:
   (a) driving a clamp, having:
      (i) a cap; and
      (ii) at least two opposed arms pivotably mounted to the cap, each of the arms having an inwardly facing finger forming an object-supporting surface,
   from a lower clamp position with the object-supporting surfaces of the fingers between the upper conveyor and the lower conveyor to an upper clamp position with the object-supporting surfaces of the fingers substantially aligned with an object-supporting surface of the upper conveyor;
   (b) extending a puller aligned with a chamber formed between the arms of the clamp along a substantially horizontal plane relative to the arms of the clamp when the arms are stationary through the chamber to fasten to the object;
   (c) slidably pulling the object with the puller from the upper conveyor onto the stationary, object-supporting surfaces of the fingers;
   (d) moving a lift from a lower lift position beneath an object-supporting surface of the lower conveyor to an upper lift position between the lower conveyor and the upper conveyor;
   (e) driving the clamp from the upper clamp position to the lower clamp position, thereby positioning the object on the lift;
   (f) pivoting the arms outwardly to retract the fingers from beneath the object; and
   (g) moving the lift from the upper lift position toward the lower lift position, thereby transporting the object to the lower conveyor.

9. The method in accordance with claim 8, wherein the step of moving the lift from the upper lift position toward the lower lift position is performed after the step of pivoting the arms outwardly to retract the fingers from beneath the object.

10. The method in accordance with claim 8, wherein the step of moving the lift from the lower lift position toward the upper lift position is performed after the step of driving the clamp from the upper clamp position to the lower clamp position.

\* \* \* \* \*